Aug. 3, 1954
L. C. REINEBACH
2,685,142
REMOTE OPERATED GRAVITY CLOSED FARM GATE
Filed May 5, 1952
4 Sheets-Sheet 1
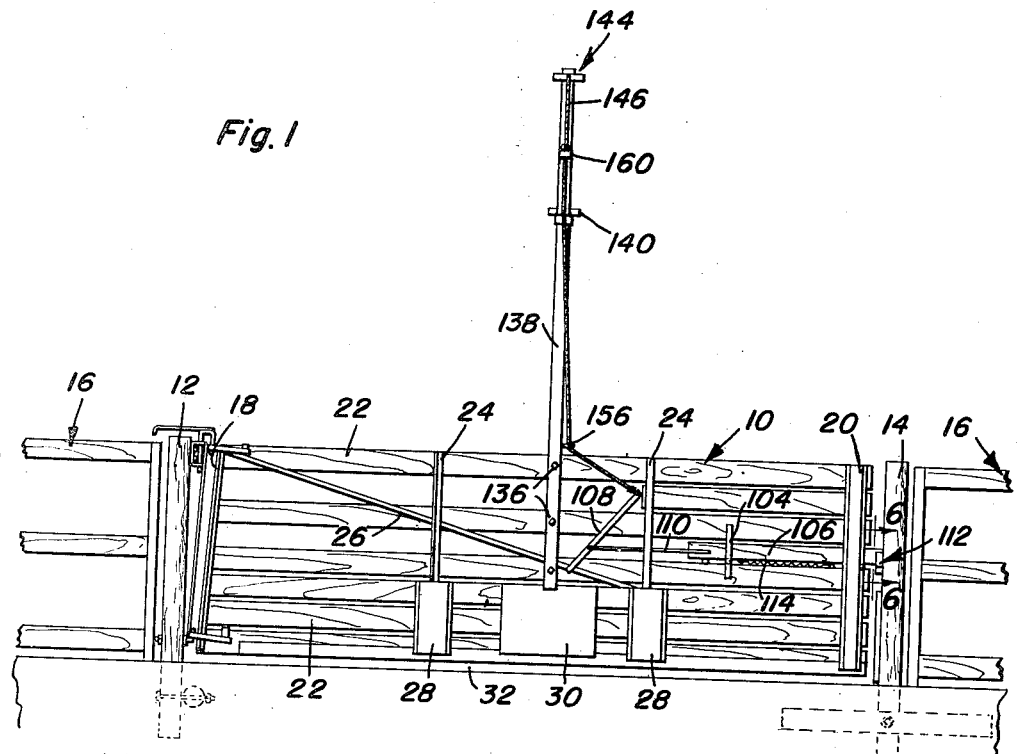
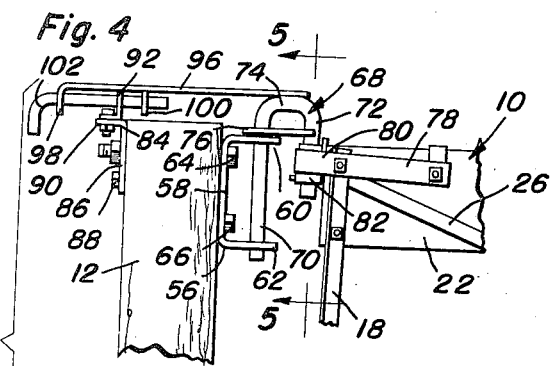
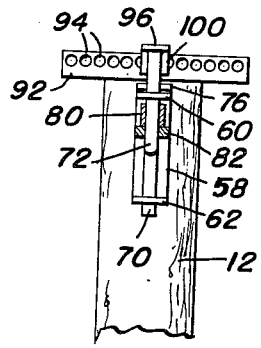
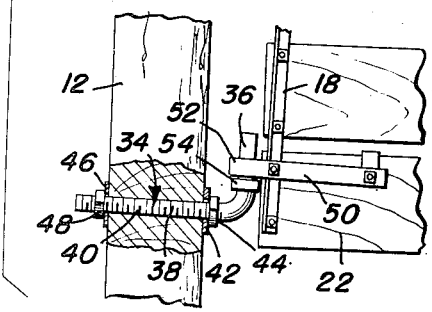
Lewis C. Reinebach
INVENTOR.
BY
Attorneys

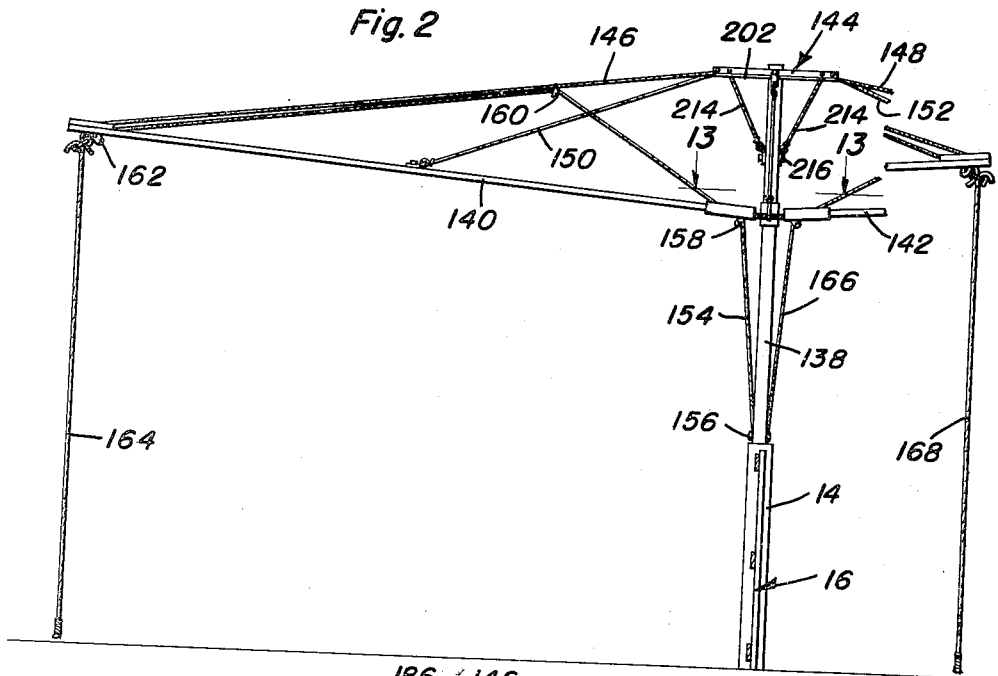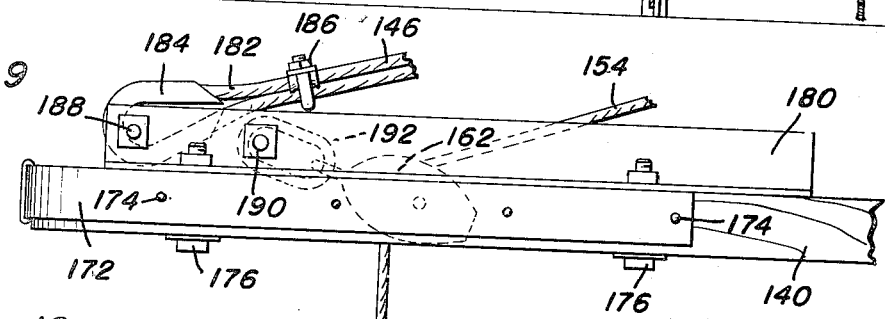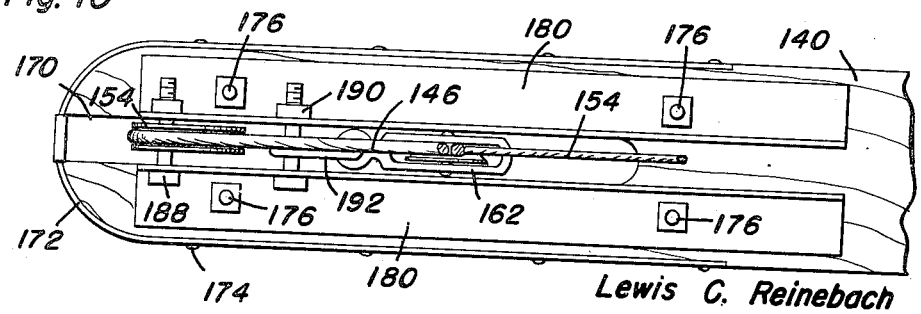

Aug. 3, 1954          L. C. REINEBACH          2,685,142
REMOTE OPERATED GRAVITY CLOSED FARM GATE
Filed May 5, 1952          4 Sheets—Sheet 3
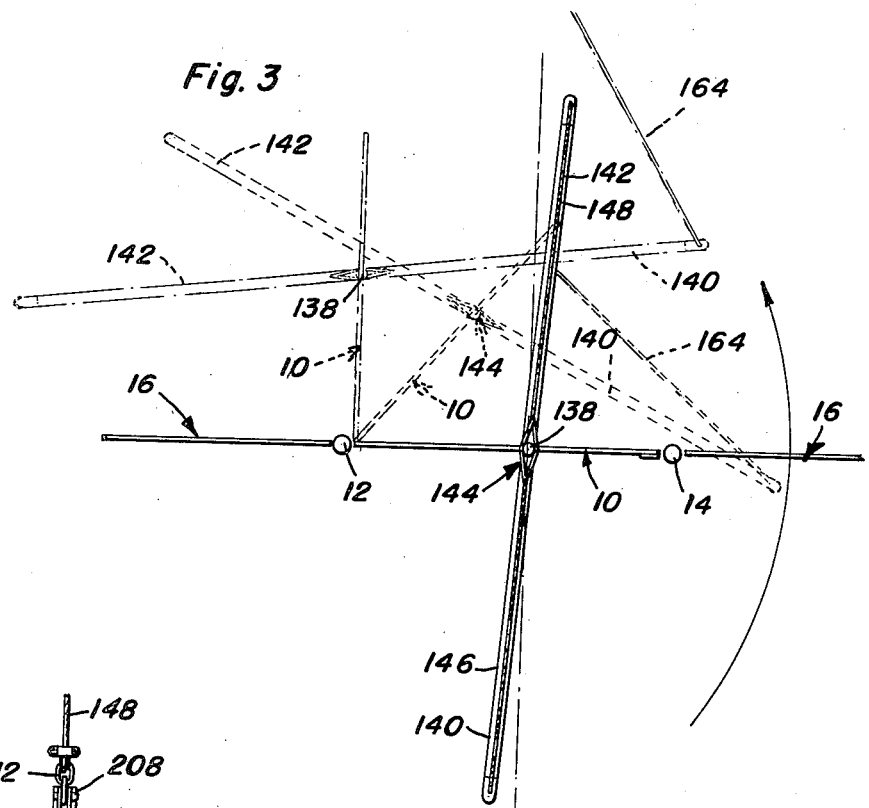
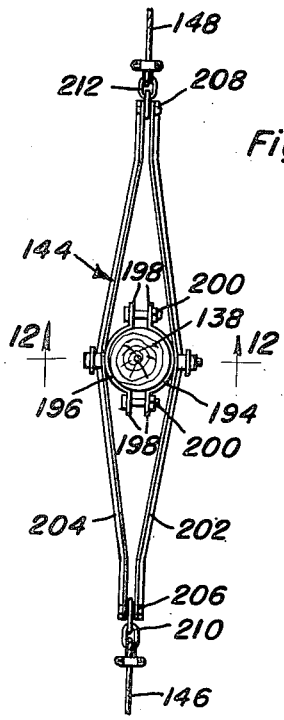
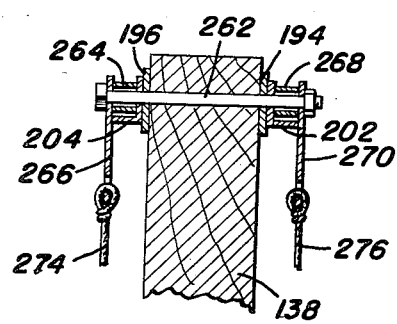
Lewis C. Reinebach
INVENTOR.

Aug. 3, 1954     L. C. REINEBACH     2,685,142
REMOTE OPERATED GRAVITY CLOSED FARM GATE
Filed May 5, 1952     4 Sheets-Sheet 4
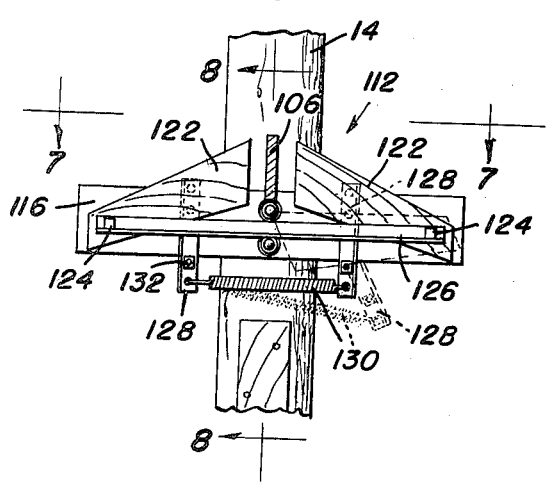
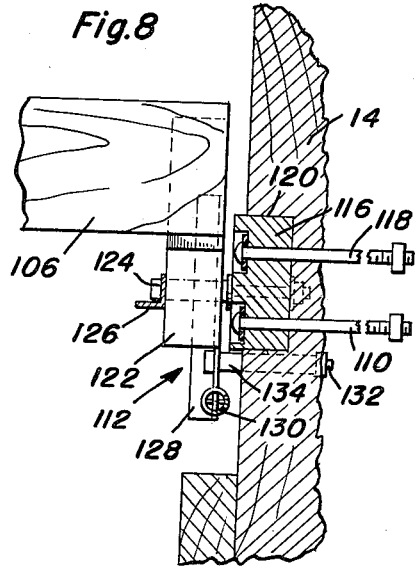
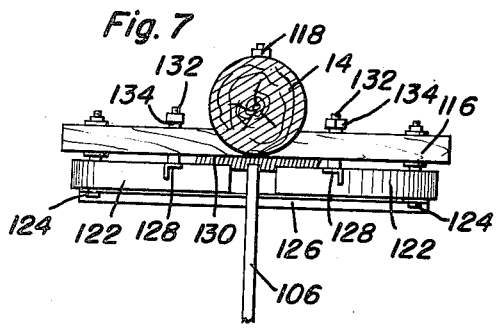
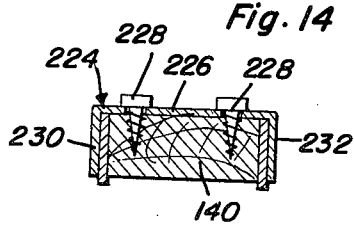
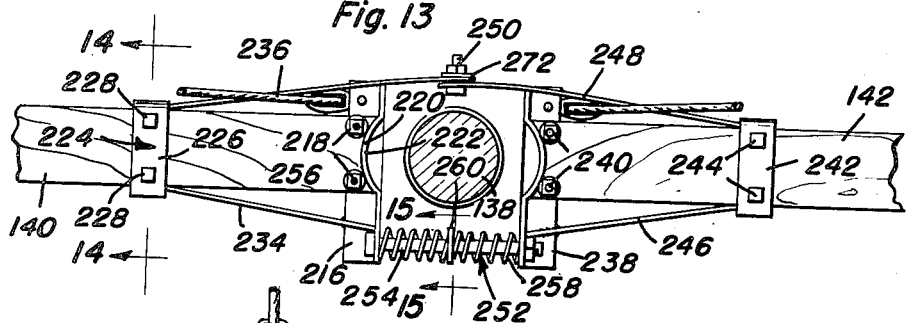
Lewis C. Reinebach
INVENTOR.

Patented Aug. 3, 1954

2,685,142

UNITED STATES PATENT OFFICE 2,685,142

REMOTE OPERATED GRAVITY CLOSED FARM GATE

Lewis C. Reinebach, Payson, Ill.

Application May 5, 1952, Serial No. 286,077

4 Claims. (Cl. 39—31)

This invention relates in general to gate structures, and more specifically to a farm gate designed expressly for permitting the passage of farm implements.

A primary object of this invention is to provide an improved farm gate construction which is provided with unlatching and opening means which may be operated at a distance from said gate whereby a person driving a tractor or like farm vehicle may open the gate while seated upon the tractor and will be enabled to retain said gate in its open position during the passage of the tractor and another implement drawn therebehind.

Another object of this invention is to provide an improved farm gate having a gate section which may be retained in its open position during the passage of a tractor and an implement drawn thereby by a farmer mounted on the tractor, said gate section being provided with a hinge structure which causes the gate section to be returned to its closed position by the force of gravity exerted thereon.

Another object of this invention is to provide an improved automatic self-closing gate section, the self-closing of the gate being due to a novel hinge construction, said hinge construction having means for adjustably positioning a hinge pin thereon whereby the hinge structure may be adjusted to compensate for wind conditions which would normally prevent the swinging of the gate to its normal closed position.

Another object of this invention is to provide an improved latch construction which includes a sliding latch bar and a novel keeper structure, said keeper structure including keeper blocks normally disposed in alignment with said latch bar for preventing the opening of the gate, said keeper blocks being depressible by said latch bar whereby said gate is automatically latched upon the closing of the same.

Another object of this invention is to provide an improved farm gate which may be unlatched and opened from a distant point, said farm gate being of a simplified construction whereby not only is it practicable, but also economically feasible.

A further object of this invention is to provide an improved farm gate which includes a gate section swingably mounted upon a gate post, said gate section having extending upwardly from the mid-point thereof a post which has mounted thereon an arm extending substantially transverse to the length of the gate section, said arm being provided with means for unlatching the gate section whereby it may be opened from a point adjacent the end of the arm.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application and in which:

Figure 1 is a front elevational view of a portion of a fence having a gate opening therein, said gate opening being closed by a gate structure which is the subject of this invention, the relationship of the various elements of the gate structure being clearly illustrated;

Figure 2 is a transverse vertical sectional view taken through the gate section of the gate structure of Figure 1 and shows the details of an arm mounted thereon and extending transversely thereof, said arm being provided with means for unlatching and opening said gate section from a point remote thereto, a portion of one-half of the arm being omitted;

Figure 3 is a top plan view on a reduced scale of the gate structure of Figure 1 and showing by dotted lines the relationship of the arm with respect to the gate section during different positions of the gate section during the course of its opening;

Figure 4 is an enlarged fragmentary front elevational view of one end of the gate section of Figure 1 and showing the construction of a hinge structure for pivotally mounting said gate section on a gate post, the central portion of the gate section and gate post being broken away;

Figure 5 is a fragmentary transverse vertical sectional view taken substantially upon the plane indicated by the section line 5—5 of Figure 4 and showing the general construction of means for adjustably positioning a top hinge pin of the hinge structure of Fig. 4;

Figure 6 is an enlarged fragmentary transverse vertical sectional view taken substantially upon the plane indicated by the section line 6—6 of Figure 1 and showing the general construction of latch means for retaining a latch bar carried by said gate section in order to retain the same in a closed position, said latch means including depressible latch blocks permitting the closing of said gate section when the latch bar is in a keeper engaging position, a depressed position of one of the keeper blocks being illustrated in dotted lines;

Figure 7 is a transverse horizontal sectional 2,685,142

3 view taken substantially upon the plane indicated by the section line 7—7 of Figure 6 and showing the general arrangement of the keeper portion of the latch means;

Figure 8 is an enlarged fragmentary transverse sectional view taken substantially upon the plane indicated by the section line 8—8 of Figure 6 and showing the manner in which the keeper portion of the latch means is mounted upon a second gate post;

Figure 9 is an enlarged side elevational view of one end of the arm mounted on the upper portion of the post carried by the gate section and shows the general details thereof including the manner in which a flexible member for releasing the latch means of the gate is mounted on the end of the arm;

Figure 10 is an enlarged fragmentary top plan view of the end of the arm illustrated in Figure 9 and shows the relationship of various elements thereof;

Figure 11 is an enlarged fragmentary top plan view of the upper end of the arm supporting post and shows the arrangement of a connection post for bracing means which are connected to the other end of the arm for bracing the same, that portion of the arm and gate section normally disposed below the upper end of the post being omitted for purposes of clarity;

Figure 12 is an enlarged transverse vertical sectional view taken substantially upon the plane indicated by the section line 12—12 of Figure 11 and shows the various details of the connecting means illustrated in Figure 11;

Figure 13 is an enlarged fragmentary horizontal sectional view taken substantially upon the plane indicated by the section line 13—13 of Figure 2 and showing the manner in which the arm is connected to said supporting post for movement with respect thereto, the portion of the gate section disposed beneath a central portion of the arm being omitted for purposes of clarity;

Figure 14 is an enlarged transverse vertical sectional view taken substantially upon the plane indicated by the section line 14—14 of Figure 13 and shows the manner in which the arms of shock absorbing means are connected to said arm; and Figure 15 is an enlarged transverse vertical sectional view taken substantially upon the plane indicated by the section line 15—15 of Figure 13 and shows the construction of the stabilizing means for the shock absorber means carried by said arm at its center.

Similar characters of reference designate similar or identical elements and portions throughout the specification and throughout the different views of the drawings.

Referring now to the drawings in detail, it will be seen that there is illustrated in Figure 1 the general arrangement of the gate construction, which is the subject of this invention, the gate construction including a gate section, which is referred to in general by the reference numeral 10 and mounted between the first and second gate posts 12 and 14 of a fence 16, said gate posts 12 and 14 being in spaced aligned relation. The gate section 10 includes vertically extending end members 18 and 20, the end member 18 at slight angle to the vertical for purposes to be explained in more detail hereinafter. Extending between the end members 18 and 20 are longitudinally extending boards 22 which form a major portion of the gate section 10. The longitudinally ex-

4 tending boards 22 are reenforced by a pair of intermediate members 24 disposed on opposite sides of the mid-point thereof. The gate section 10 is further braced by a diagonal brace member 26 which extends from the upper end member 18 to the bottom of the intermediate member 24 furthest therefrom. Each of the intermediate members 24 are provided with beveled boards 28 at the lower ends thereof, the beveled boards being covered with sheet metal in order to prevent damage thereto when engaged by farm implements. The lower central portion of the gate section 10 is also reenforced by a sheet of metal 30 secured to the lower boards 22 thereof. The bottom board 22 is provided with a metal strip 32 at the lower portion thereof in order to protect the same from damage by engagement with farm implements. It will be understood that the various portions secured to the boards 22 are duplicated on the opposite side of the gate section 10.

Referring now to Figure 4 in particular, it will be seen that the gate section 10 is pivotally secured to the first gate post 12 by a hinge structure which permits the automatic closing of the gate section due to the force of gravity. The hinge construction includes a lower hinge pin 34 which has a vertical leg 36 and a horizontal leg 38. The horizontal leg 38 of the hinge pin is threaded throughout its entire length and extends through a bore 40 in the lower portion of the first gate post 12. Disposed on the horizontal portion 38 is a washer 42 and a nut 44, the washer and nut being adjacent the vertical leg 36 and engaging one side of the gate post 12. Disposed on the other side of the gate post 12 is a washer 46 and a nut 48 mounted on the free end of the horizontal leg 38 and tightly engaging the gate post 12 to maintain the vertical leg 36 in an adjusted vertical position. Carried by the lowermost board 22 of the gate section 10 and secured to the bottom of the end member 18 is a lower hinge eye member 50 having a hinge eye portion 52 receiving the vertical leg 36 of the hinge pin 34. Downward movement of the hinge eye portion 52 on the vertical leg 36 is limited by a collar 54 welded thereto. It will be noted that the vertical leg 36 of the hinge pin 34 is closely adjacent the gate post 12 and is at a slight angle to the vertical and in spaced parallel relation to the end member 18.

Carried at the upper end of the gate post 12 is a C-shaped mounting bracket 56 which includes a web portion 58 and upper and lower horizontal flanges 60 and 62. The bracket 56 is connected to the gate post by a bolt 64 extending through the upper portion of the base 58 and a lag screw 66 extending through the lower portion of the base.

Pivotally supported by the C-shaped bracket 56 is an inverted J-shaped upper hinge pin 68, said hinge pin 68 including a long vertical leg 70 and a short vertical leg 72 connected together at their upper ends by a short horizontal portion 74. The long leg 70 is carried by the upper and lower flanges 60 and 62 of the C-shaped bracket 56 for rotation and is in spaced parallel relation to the gate post 12. Downward movement of the long leg 70 is limited by a horizontal bar 76 extending between the long leg 70 and the short leg 72. The bar 76 is parallel to the horizontal portion 74 and spaced therebelow to permit the horizontal portion 74 to be positioned above the upper end of the gate post 12.

Carried by the uppermost board 22 of the gate section 10 and connected to the upper end of the end member 18 is a top hinge eye member 78 having a hinge eye portion 80 in which is received the short leg 72 of the top hinge pin 68. Downward movement of the hinge eye portion 80 along the short leg 72 is limited by a collar 82 adjustably mounted on the short leg 72 therebelow. It will be noted that the short leg 72 is at a slight angle to both the gate post 12 and the long leg 70 and is parallel to the end member 18. It will also be noted that the short leg 72 of the hinge pin 68 is disposed further away from the gate post 12 than is the vertical leg 36 of the hinge pin 34 so as to be in alignment therewith. The mounting of the gate section 10 by a hinge construction having a hinge axis at a slight angle to the vertical results in the gate section 10 being automatically urged to its normal closed position due to the force of gravity thereon in the well-known manner.

Although the gate section 10 has a tendency to seek a state of equilibrium at its normally closed position, it will be readily understood that a force of gravity exerted is relatively small and that wind may exert such a force upon the gate section 10 so as to prevent it being urged to its normal closed position. Therefore, it is desirous that some means be provided for pivoting the upper hinge pin 68 so as to move the short leg 72 with relation to the vertical leg 36 in order to compensate for a wind from any direction. The means provided to accomplish this desired feature includes an L-shaped bracket 84 which has a vertical leg 86 connected to the upper end of the gate post 12 opposite the web 58 of the bracket 56. The upper portion of the vertical flange 86 is connected to the gate post 12 by the bolt 64 and the lower portion thereof is connected to the gate post by a lag screw 88. The angle shaped bracket 84 is also provided with a horizontal leg 90 which has connected thereto an inner angle bar 92 which includes a vertical flange provided with a plurality of closely spaced horizontally aligned apertures 94. Welded to the upper side of the horizontal portion 74 of the hinge pin 68 is a rearwardly extending bar 96 which has a downturned flange 98 at the rear end thereof. Extending downwardly from the bar 96 intermediate its ends is a second flange 100 which is in spaced parallel relation to the rear flange 98. Extending between and slidably mounted in the flanges 98 and 100 is an L-shaped bolt member 102 which is selectively passed through one of the apertures 94 and the angle bar 92. By moving the bolt member 102 rearwardly and out of its respective aperture 94, the bar 96 may be twisted to the desired angle with the resulting pivoting of the hinge pin 68 so as to change the relationship of the short leg 72 with respect to the vertical leg 36 through the hinge pin 34. The bolt member 102 is then passed through one of the apertures 94 in the angle bar 92 and the upper hinge pin 68 is retained in its adjusted position to thereby increase the closing force of gravity in the direction of the shift. The gate will be gravity urged in one direction or the other, depending upon the direction of the offsetting, to compensate for wind pressures on the gate. It is readily apparent that when an upper hinge pin is shifted relative to the lower hinge pin, a gate is urged in the direction of the shift and will compensate for forces opposing the shift. Assuming the forces as being wind forces, it will be seen that by shifting the upper pin towards the wind the effect of the wind on the gate will be counterbalanced.

Referring now to Figure 1 in particular, it will be seen that positioned intermediate the end member 20 and the adjacent intermediate member 24 on each side of the fence section 10 is a vertically extending strap 104 which extends between two adjacent boards 22 of the fence section 10. Disposed between the two adjacent boards 22 to which the straps 104 are connected is a longitudinally extending latch bar 106, the latch bar 106 being guided by the straps 104 and the end members 20. Secured to the lowermost of the two boards 22 to which the straps 104 are secured is the lower end of a lever 108 which is pivotally mounted for movement away from the end members 20. Connected to the lever 108 intermediate its ends is a flexible member 110 which is connected to the inner end of the latch bar 106 for moving the same in response to the pivoting of the lever 108. The latch bar 106 extends past the end of the gate section 10 and is in engagement with a keeper structure referred to in general by the reference numeral 112 mounted on the second gate post 14. The latch bar 106 is urged into engagement with the keeper structure 112 by a tension spring 114 secured at one end to the keeper bar 106 and the other end to one of the end members 20, and is mounted on rollers (not shown).

Referring now to Figures 6, 7 and 8 in particular, it will be seen that the keeper structure 112 includes a transversely extending horizontally disposed keeper support member 116 which is secured to the gate post 14 of a pair of bolts 118 and disposed in a notch 120 in the gate post 14. Pivotally connected to the keeper support 116 adjacent the ends thereof are tapered keeper blocks 122 whose opposed ends are in spaced align relation and receive therebetween the other end of the latch bar 106 in order to prevent the swinging of the gate section 10 with respect to the gate post 14. Each keeper block 122 is pivotally connected to the keeper support 116 by a fastener 124, the fastener 124 of the two keeper blocks 122 being connected together by an angle member 126 which extends longitudinally of the keeper support 116 in order that stress is imposed upon one fastener 124 will be equally shared by the other fastener 124 in a manner to be described in more detail hereinafter.

The keeper blocks 122 are mounted for downward pivoting in order that the gate section may swing to a closed position and the end of the latch bar 106 depresses one of the keeper blocks 122 to a substantially horizontal position as illustrated in dotted lines in Figure 6. In order that the keeper blocks 122 may be automatically returned to their normal position, each is provided with a downwardly extending angle member 128 recessed in the rear side thereof and rigidly secured thereto by conventional fasteners. The lower ends of the vertically extending angle members 128 secured to the keeper blocks 122 are connected together by a coil spring 130 which is normally under tension. As the end of the latch bar 106 swings toward the keeper structure 112 and strikes one of the keeper blocks 122 to depress the same, the lower end of the respective vertical angle bar 128 is moved downwardly and outwardly whereby the coil spring 130 is placed under tension and as soon as the latch bar 106 passes over the keeper block 122 it is urged upwardly by the coil spring 130 to its normal position. Upward movement of each of the keeper blocks 122 is limited by a rearwardly extending fastener 132 having a spacer 134 thereon for engaging the underside of the keeper support 116. As the keeper bar 106 strikes the end of the other keeper block 122, the shock transmitted through the keeper block 122 to its respective fastener 124 is partially taken up by the other fastener 124 due to the action of the angle bar 126.

Referring now to Figures 1 and 2 in particular, it will be seen that secured to the mid-point of the uppermost three boards 22 of the gate section 10 by fasteners 126 is a vertically extending post 138. Carried by the post 138 adjacent the upper end thereof is an arm which extends transversely of the gate section 10 and includes two arm sections 140 and 142 which extend upwardly and outwardly from the post 138. Mounted at the upper end of the post 138 is a frame structure referred to in general by the reference numeral 144 and having extending therefrom bracing cables 146 and 148 which are secured to the ends of the arm sections 140 and 142, respectively, in order to restrain them against downward movement. The arm sections 140 and 142 are further braced by cables 150 and 152, respectively, which extend downwardly from the frame structure 144 and are connected to the arm sections at their midpoints.

Connected to the upper end of the lever 108 at one side of the gate section 10 is a cable 154 which passes over a pulley 156 at the lower end of the post 138 adjacent the upper board 22 of the gate section 10 and extends upwardly therefrom. The cable 154 then passes over a pulley 158 which is disposed adjacent the inner end of the arm section 140, and then continues upwardly and outwardly to a pulley 160 carried by the cable 146. The cable 54 then extends outwardly and downwardly in substantially parallel relation to the cable 146 to a point adjacent the other end of the arm section 140 where it passes over a pulley 162 carried thereby. The end of the cable 154 is connected to a depending rope 164 which will not pass through the pulley 162 and thereby prevents excess slack in the cable 154. By pulling on the rope 164 the upper end of the lever 108 may be pulled inwardly towards the post 138 with the result that the latch bar 106 is moved inwardly from between the keeper blocks 122 and the gate section 10 is free to be swung. By pulling on the rope 164 and urging the same toward the gate section 10, the gate section 10 will be swung to an open position.

Carried by the arm section 142 and connected at its lower end to the lever 108 on the opposite side of the gate section 10 is a similar cable 166 which is disposed on the same type of pulley arrangement as is the cable 154 and is connected at its other end to a depending rope 168 which operates in the same manner as rope 164. The free ends of the ropes 164 and 168 are whipped to prevent unravelling.

Inasmuch as the other end of the arm section 140 is identical to the other end of the arm section 142, only the details of the outer end of the arm section 140 will be specifically explained.

Referring now to Figures 9 and 10, it will be seen that the arm section 140 is provided with an elongated longitudinally extending centrally disposed slot 170 whose outer end is closed by a strap 172 which extends around the entire end of the arm section 140 in order to reenforce the same, the strap 172 being secured to the arm section 140 by a plurality of fasteners 174. Secured to the upper surface of the arm section 140 by a plurality of fasteners 176 is a pair of longitudinally extending spaced parallel angle members 180, each of the angle members 180 having a vertical flange in opposed relation with the vertical flange of the other angle member and aligned with the outer edge of the slot 170.

The cable 146 supporting the outer end of the arm section 140 is provided at its outer end with a loop 182 in which is mounted a wire thimble 184, the cable 146 being clamped into the loop 182 by a cable clamp 186 clamped thereon. The wire thimble 184 is secured to the other end of the angle member 180 by a transversely extending bolt 188 which extends between their vertical flanges, the wire thimble 184 being disposed between the vertical flanges of adjacent angle members 180. Extending between the vertical flanges and the angle members 180 and spaced inwardly from the bolt 188 is a second bolt 190 on which is mounted a link 192 disposed within the elongated slot 170. Connected to the inner end of the link 190 is the pulley 162 over which the cable 154 is entrained. It will be noted that the pulley 162 is disposed within the elongated slot 170 and the cable 154 passes therethrough.

Referring now to Figure 11 in particular, it will be seen that the frame structure 144 mounted at the upper end of the post 138 includes a pair of semi-circular clamp elements 194 and 196 which are provided with outwardly extending flanges 198 at the ends thereof. Extending between the flanges 198 are bolts 200 which urge the flanges 198 together and thereby causing the clamp elements 194 and 196 to tightly clamp the upper end of the post 138. Rigidly secured to the clamp elements 194 and 196 are angle members 202 and 204, respectively, whose ends converge outwardly of the post 138 and are connected together by fasteners 206 and 208.

The fastener 206 is provided with a few sections of chain 210, one end of the chain 210 having its end link secured over the fastener 206 and disposed between the ends of the angle members 202 and 204, and the other end link of the chain 210 receiving therethrough the inner end of the bracing cable 146 and the inner end of the bracing cable 150. Carried by the fastener 208 is a similar chain 212 to which are secured the ends of the bracing cables 148 and 152.

Referring now to Figure 10 in particular, it will be seen that the angle members 202 and 204 which form a major portion of the frame structure 144 are braced against downward movement due to the strain imposed thereon by associated cable braces. The bracing for the angle members 202 and 204 include a pair of downwardly and inwardly extending cables 214 which are secured at their lower ends to a bolt 216 extending transversely of the post 138. It will be understood that as one end of the frame structure 144 tends to move downwardly the upward movement of the other end is prevented by its associated cable 214.

Referring now to Figure 13 in particular, it will be seen that the inner ends of the arm sections 140 and 142 are not rigidly secured to either the post 138 or to each other. Carried at the inner end of the arm section 140 is a transversely extending angle member 216 with a horizontal flange underlying the inner end of the arm section 140 and rigidly secured thereto by a pair of fasteners 218. The vertical flange of the angle member 216 is provided with an outwardly projecting curve portion 220 which is received within a similar curved recess 222 in the end of the arm section 140 and limits the pivoting of the same with respect to the angle member 216. Carried by the arm section 140 and spaced outwardly from the angle member 216 is an inverted channel shaped member 224 which has a web 226 overlying the arm section 140 and secured thereto by a pair of lag bolts 228. The inverted channel member 224 is also provided with a pair of downwardly extending flanges 230 and 232 which are spaced a slight distance from the edges of the arm section 140.

Secured to the inner face of the flange 230 at one end and connected to the angle member 216 adjacent an outer end thereof at the other end is a flat brace member 234. The flange 232 of the inverted channel member 224 has secured to the inner side thereof one end of a flat brace member 236 which is connected intermediate its ends to the other end of the angle member 216 and extends outwardly therefrom to approximately the center line of the post 138 to form a first hinge bar.

The arm section 142 is provided at its inner end with a similar angle member 238 which is secured thereto by fasteners 240. Also carried by the arm section 142 is an inverted channel-shaped member 242 which is secured thereto by a plurality of lag bolts 244. Extending between the inverted channel member 242 and a point intermediate one end of the angle member 238 is a brace 246 which is similar to the brace 234. Extending from the other side of the inverted channel shaped member 242 and connected to the other end of the angle member 238 is a brace member 248 which is similar to the brace member 236 and forms a second hinge bar. The ends of the brace members 236 and 248 are loosely connected together by a pivoted fastener 250. The connecting together of the inner ends of the brace members 236 and 248 are a loosely fitting fastener 258 forms a hinge whereby the two ends of the arm sections 140 and 142 may move towards each other when an inwardly directed force is applied on one or both ends thereof.

In order that the hinging action of the brace members 236 an 248 may be limited and the arm sections 140 and 142 be returned to the normal position after the force on the ends thereof have been released, a shock absorbing structure 252 is provided. The shock absorbing structure 252 includes an elongated bolt 254 which extends between the outer ends of the angle members 216 and 238 adjacent their connections to the brace members 234 and 246, respectively. Mounted on the elongated bolt 254 is a pair of coil springs 256 and 258 which are disposed on the opposite sides of a centrally located upstanding bar 260 carried by the bolt 254.

Referring now to Figure 12 in particular, it will be seen that the clamp elements 196 and 194 are positioned with respect to the upper end of the post 138 by a transversely extending elongated bolt 262. Disposed on the bolt 262 adjacent the head thereof is a sleeve 264 which spaces a downwardly extending bar 266 carried by the bolt 262 from the adjacent angle member 204 which is secured to the clamp element 196. Disposed on the other end of the bolt 262 and engaging a vertical flange of the angle member 202 associated with the clamp element 124 is a sleeve 268 which spaces a downwardly extending bar 270 from the angle member 202.

Inasmuch as the inner ends of the arm sections 140 and 142 are not rigidly connected to the post 138, there must be provided some means of support therefor. Accordingly, the fastener 250 joining together the ends of the brace members 236 and 248 is provided with an upstanding bar 272 which extends generally parallel to the longitudinal axis of the bar 260. The upper end of the bar 272 is connected to the downwardly directed bar 266 by a cable 274 and supported therefrom. The bar 260 is connected to the bar 270 by a similar cable 276 and supported therefrom also.

In view of the above described connection for the arm sections 140 and 142, it is obvious that a considerable pressure may be exerted upon the ends thereof by pulling their associated ropes 164 and 168, respectively, without damaging the same. Furthermore, the novel mounting means permits the slight twisting of the arm sections with respect to the posts 138 without breaking any rigid connections as a limited amount of rotation with respect to the post 138 is permitted.

Referring now to Figure 3 in particular, it will be seen that the arm sections 140 and 142 extend substantially transversely to a gate section 10 and at a slight angle to the transverse axis thereof with the outer end of the arm section 140 being disposed slightly to the left of the transverse axis of the gate section 10. When a farmer approaches the gate section 10 from the side on which the arm section 140 is disposed, he may remain seated on his tractor and release the latch bar 106 from engagement with the keeper blocks 122 by pulling on the rope 164 depending from the other end of the arm section 140. While continuing to pull on the rope 164, the tractor may be moved forwardly with the result that the end of the arm section 140 will be urged towards the gate section 10 and the gate section 10 pivoted about its hinge structure mounted on the gate post 12. However, if desired the tractor may be moved into engagement with the metal plated bevel boards 28 disposed at the lower ends of the intermediate supports 24 and the gate section 10 pushed by the tractor.

Regardless of the manner in which the gate section 10 is initially opened, the rope 164 remains under tension as the farmer moves through the gateway with the result that the gate section 10 is pivoted to a fully open position. It will be noted that when the gate section 10 is in its fully open position, the force on the other end of the arm section 140 is substantially normal thereto with the result that the arm section 140 is twisted with respect to the post 138. As the tractor and whatever farm implements it is drawing, not shown, move through the gateway the gate section 10 is retained in its open position by continuing pulling on the rope 164 and letting the same slide through the farmer's hand until the end thereof is reached. At this time the tractor and implement drawn thereby has cleared at the gate section and it is free to return to its normal closed position due to the force of gravity exerted thereon. It will be understood that the gate section 10 may be operated from a tractor passing through the gateway in the opposite direction by grasping the rope 168 depending from the outer end of the arm section 142.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. A farm gate comprising a swinging gate section hingedly connected to a first gate post and latchable to a second gate post spaced from said first gate post, means carried by said gate section for opening same from a distance at one side thereof, said means permitting an operator to retain said gate section in an open position from a distant point on the opposite side of said gate section, said means including an arm mounted transversely of said gate section, latch releasing means carried by said arm, said arm being mounted at the upper end of a vertical post carried by said gate section, said arm being rotatably connected to said post, shock absorbing means maintaining said arm in a normal position, said shock absorbing means including a bracket carried by said post, an elongated fastener carried by said arm passing through said bracket, spring means on said fastener engaging said bracket and resisting rotation of said arm relative to said pole.

2. A farm gate comprising a swinging gate section hingedly connected to a first gate post and latchable to a second gate post spaced from said first gate post, means carried by said gate section for opening same from a distance at one side thereof, said means permitting an operator to retain said gate section in an open position from a distant point on the opposite side of said gate section, said means including an arm mounted transversely of said gate section, latch releasing means carried by said arm, said arm being mounted at the upper end of a vertical post carried by said gate section, said arm being rotatably connected to said post, shock absorbing means maintaining said arm in a normal position, said arm being formed in sections disposed in diametrically opposite relation on opposite sides of said pole, said sections being hingedly connected together at one side of said pole, said shock absorbing means including a fastener connecting together said sections on a side of said pole opposite from the hinge connection, a bracket carried by said pole, said fastener passing through said bracket, springs carried by said fastener engaging said sections and said bracket to resist rotation of said arm relative to said pole.

3. A farm gate comprising a swinging gate section hingedly connected to a first gate post and latchable to a second gate post spaced from said first gate post, means carried by said gate section for opening same from a distance at one side thereof, said means permitting an operator to retain said gate section in an open position from a distant point on the opposite side of said gate section, said means including an arm mounted transversely of said gate section, latch releasing means carried by said arm, said arm being mounted at the upper end of a vertical post carried by said gate section, said arm being rotatably connected to said post, shock absorbing means maintaining said arm in a normal position, said arm being formed in sections disposed in diametrically opposite relation on opposite sides of said pole, said sections being hingedly connected together at one side of said pole, said shock absorbing means including a fastener connecting together said sections on a side of said pole opposite from the hinge connection, a bracket carried by said pole, said fastener passing through said bracket, springs carried by said fastener engaging said sections and said bracket to resist rotation of said arm relative to said pole, said sections being braced by cables connected to said sections and to said post above said bracket.

4. A farm gate comprising a swinging gate section hingedly connected to a first gate post and latchable to a second gate post spaced from said first gate post, means carried by said gate section for opening same from a distance at one side thereof, said means permitting an operator to retain said gate section in an open position from a distant point on the opposite side of said gate section, said means including an arm mounted transversely of said gate section, latch releasing means carried by said arm, said arm being mounted at the upper end of a vetrical post carried by said gate section, said arm being rotatably connected to said post, shock absorbing means maintaining said arm in a normal position, said arm being formed in sections disposed in diametrically opposite relation on opposite sides of said pole, said sections being hingedly connected together at one side of said pole, said shock absorbing means including a fastener connecting together said sections on a side of said pole opposite from the hinge connection, a bracket carried by said pole, said fastener passing through said bracket, springs carried by said fastener engaging said sections and said bracket to resist rotation of said arm relative to said pole, the hinge connection including a pair of brace members connected to opposed ends of said sections, said brace members having overlapped inner ends loosely connected together by a fastener loosely received in apertures therein.

References Cited in the file of this patent

UNITED STATES PATENTS

| Number | Name | Date |
|---|---|---|
| 58,983 | Cheatham | Oct. 23, 1866 |
| 194,876 | Mason | Sept. 4, 1877 |
| 331,778 | Dunn | Dec. 8, 1885 |
| 396,558 | Godfrey | Jan. 22, 1889 |
| 821,793 | Fears | May 29, 1906 |
| 843,617 | Miller | Feb. 12, 1907 |
| 969,678 | West | Sept. 6, 1910 |
| 1,748,002 | Thompson | Feb. 18, 1930 |
| 2,062,738 | Bigler | Dec. 1, 1936 |
| 2,599,211 | Tilbury | June 3, 1952 |